(12) United States Patent
Brothers (10) Patent No.: US 8,308,104 B2
(45) Date of Patent: Nov. 13, 2012

(54) AIRCRAFT HAVING A ROTATING TURBINE ENGINE

(76) Inventor: Kamyar Brothers, Los Angeles, CA (US)

( * ) Notice: Subject to any disclaimer, the term of this patent is extended or adjusted under 35 U.S.C. 154(b) by 480 days.

(21) Appl. No.: 12/755,365

(22) Filed: Apr. 6, 2010

(65) Prior Publication Data
US 2011/0168833 A1 Jul. 14, 2011

Related U.S. Application Data

(63) Continuation-in-part of application No. 12/139,332, filed on Jun. 13, 2008, now Pat. No. 8,020,365.

(51) Int. Cl.
*B64C 15/00* (2006.01)
(52) U.S. Cl. ...................................... 244/12.2
(58) Field of Classification Search ............... 244/73 C, 244/26, 12.1, 12.2, 12.3, 12.5, 53 B
See application file for complete search history.

(56) References Cited

U.S. PATENT DOCUMENTS

| | | | |
|---|---|---|---|
| 2,997,254 A * | 8/1961 | Mulgrave et al. | 244/12.2 |
| 4,050,652 A * | 9/1977 | DeToia | 244/23 C |
| 4,553,386 A | 11/1985 | Berg | |
| 4,671,734 A | 6/1987 | Topness et al. | |
| 5,170,963 A * | 12/1992 | Beck, Jr. | 244/12.2 |
| 5,203,521 A * | 4/1993 | Day | 244/12.2 |
| 5,259,571 A * | 11/1993 | Blazquez | 244/12.2 |
| 6,050,520 A * | 4/2000 | Kirla | 244/23 A |
| 6,270,036 B1 * | 8/2001 | Lowe, Jr. | 244/12.2 |
| 6,286,783 B1 * | 9/2001 | Kuenkler | 244/30 |
| 6,375,117 B1 * | 4/2002 | Cain | 244/23 R |
| 6,572,053 B2 * | 6/2003 | Salas | 244/12.2 |
| 6,581,872 B2 * | 6/2003 | Walmsley | 244/12.2 |
| 2009/0308050 A1 | 12/2009 | Brothers | |

* cited by examiner

*Primary Examiner* — Tien Dinh
*Assistant Examiner* — Keith L Dixon
(74) *Attorney, Agent, or Firm* — Trojan Law Offices (57) ABSTRACT

The present invention describes an aircraft having a rotating engine. The aircraft comprises a means for rotating the engine 360° to allow directional control of the aircraft via rotation of the engine's thrust output. The aircraft can further comprise a plurality of flap members located on the wings of the aircraft and in communication with the rotating gas turbine engine to further control and stabilize flight of the aircraft. The gas turbine engine of the aircraft can comprise a compressor, a combustion chamber, and at least two turbines mounted oppositely to the combustion chamber, such that the gas turbine engine is capable of generating more thrust from a single engine.

15 Claims, 7 Drawing Sheets

AIRCRAFT HAVING A ROTATING TURBINE ENGINE

CROSS-REFERENCE TO RELATED APPLICATIONS

This application is a continuation-in-part application of and claims priority to U.S. application Ser. No. 12/139,332, filed on Jun. 13, 2008 now U.S. Pat. No. 8,020,365, which is hereby incorporated by reference in its entirety.

BACKGROUND OF THE INVENTION

1. Field of the Invention

The present invention relates to an aircraft, and more particularly to an aircraft having a rotating turbine engine.

2. Description of the Prior Art

Aircraft powered by internal combustion turbine engines have long been known in the art. The turbojet engine was first used to power aircraft in the late 1930's and is comprised generally of a compressor, a combustion chamber, and a turbine. In a conventional gas turbine engine, the air compressor is mechanically coupled to the combustion chamber, which in turn is coupled to the turbine. A gas turbine engine of this kind operates by compressing air in the compressor to high pressure. The compressed air is communicated to the combustion chamber, where it is mixed with gas and ignited to undergo combustion. The resulting combustion produces a high pressure, high velocity gas mixture that is directed to the turbine, motivating the turbine to generate force. The gas mixture is expelled through a nozzle in the turbine, generating thrust by accelerating the hot exhaust gas mixture to atmospheric pressure. The thrust output energy of the engine is used to power the aircraft.

Since their early development, aircraft have utilized engines having multiple turbines to generate a greater thrust than can be achieved by using one turbine alone. The turbines are generally connected in series, with one turbine behind another. In this kind of gas turbine engine, the turbines are mounted on the same side of the compressor such that exhaust from the first turbine is transferred to the second turbine. However, the connection of turbines in series does not maximize the possible thrust output of the turbines.

For example, U.S. Pat. No. 6,968,698 to Walsh et al. teaches a gas turbine engine having three turbines arranged to flow in series. According to Walsh et al., the first turbine is arranged to drive a first compressor, the second turbine is arranged to drive a second compressor, and the third turbine is arranged to drive an output shaft. The turbines are arranged in series on the downstream side the combustor. Because the turbines are arranged in series, the thrust output is dissipated as the energy produced by the combustion travels from turbine to turbine, with only the third turbine arranged to drive the output shaft. In the gas turbine engine taught by Walsh et al., the combustion of high velocity, high pressure gas mixture from the combustion chamber cannot be simultaneously and equally directed to the three turbines to generate maximum thrust because the turbines are arranged in series.

Similarly, U.S. Pat. No. 4,674,284 to Kronogard et al. teaches a combustion engine having two turbines connected in series, of which one drives the compressor and the other transfers its output to the engine mechanically. Kronogard et al. teaches that the turbines and the compressor are mounted at the same side of the engine. Again, the thrust output is dissipated as the energy produced by the combustion travels from turbine to turbine, because the turbines are arranged in series. In the gas turbine engine taught by Kronogard et al., the combustion of high velocity, high pressure gas mixture from the combustion chamber cannot be simultaneously and equally directed to the three turbines to generate maximum thrust because the turbines are arranged in series.

Similarly, U.S. Pat. No. 4,038,818 to Snell teaches a gas turbine for aircrafts having two compressors and two turbines arranged in flow series. The arrangement of the turbines in series does not maximize the thrust output because energy is dissipated as the combustion of high velocity, high pressure gas mixture from the combustion chamber travels from the first turbine to the second turbine.

Accordingly, there is a need for an aircraft having a gas turbine engine that can maximize thrust output by employment of multiple turbines that are not arranged in series.

There is a need for an aircraft having a gas turbine engine having at least two turbines arranged to receive the combustion of high velocity, high pressure gas mixture from the combustion chamber simultaneously.

There is a need for an aircraft having a gas turbine engine having at least two turbines arranged in an opposite configuration to receive the combustion of high velocity, high pressure gas mixture from the combustion chamber simultaneously such that the gas mixture is expelled in the same direction to maximize thrust output. Such an aircraft would have greater propulsive thrust and operate more efficiently than those currently known.

Further, aircraft known in the art utilize conventional means to control the direction of aircraft while in flight. An aircraft generally has three axes of rotation, namely, the longitudinal axis, the vertical axis, and the lateral axis. The longitudinal axis extends lengthwise (nose through tail) and rotation about this axis is called "roll." The lateral axis extends across the aircraft from wing to wing and rotation about this axis is called "pitch." The vertical axis extends vertically through the cross-section of the other two axes and rotation about this axis is called "yaw."

Roll about longitudinal axis is usually controlled via the action of ailerons. Ailerons are attached to the wing and move the wing up when the aileron is in a downward position because it produces more lift on the wing. When the aileron is facing upward, it will reduce lift on the wing and move the wing down. For example, to roll an aircraft to the right, the aileron on the right wing will be raised and the aileron on the left wing will be lowered.

Pitching movement is controlled by the elevator, which is attached to the horizontal stabilizer. The elevator can be deflected up to move the tail of the aircraft down for ascent of the aircraft, or the elevator can be moved down for descent of the aircraft.

The yaw, or movement of the aircraft about the vertical axis in a side-to-side direction and is normally controlled by a rudder. Moving the rudder to the right or left will cause the aircraft to move to the right or left.

All of the above mechanisms used to control the roll, pitch and yaw of the aircraft, including ailerons, elevator, and rudders, can be manipulated by cockpit controls.

As set forth above, conventional aircraft known in the art do not recite directional control of the aircraft via rotating an engine's propulsive thrust. The directional movement of the aircraft is gradual and does not allow for sharp changes in the directional movement of the aircraft.

Other aircraft known in the art, such as vertical take-off and landing aircraft, utilize stationary engines, or engines having rotating nozzles to direct their propulsive thrust downward for lift-off and horizontally for forward flight, and intermediate directions therebetween. For example, U.S. Pat. No. 5,372,337 to Kress et al. describes an aircraft having a single engine with dual jet exhausts. The jet exhausts further comprise nozzles mounted to the exhausts that are vertically oriented for takeoff and landing, and horizontally positioned for cruise. The nozzles direct the exhaust in downward and aft directions, as well as intermediate angles.

Similarly, U.S. Pat. No. 5,062,588 to Garland describes a thrust deflector for use in a vertical or short take-off and landing aircraft. The nozzles are rotatable to discharge pressurized gas from an engine downwardly or rearwardly, depending on the position of the nozzles.

However, aircraft in the prior art does not disclose a means to rotate a gas turbine engine 360° and therefore rotate the propulsive thrust generated by the engine 360° to control the direction of the aircraft and make quicker and sharper turns while in flight. Thus, there exists a need for this improvement in aircraft as well.

The present invention is directed to an aircraft having a means to rotate the gas turbine engine 360° to enable quicker and sharper directional changes of the aircraft. Further, the aircraft can have a gas turbine engine comprising at least two turbines that are mounted opposite to one another. The turbines are not connected in series. Instead, the turbines are mounted on opposite sides of the combustion chamber, such that the combustion of high velocity, high pressure gas mixture from the combustion chamber can be simultaneously and equally directed to both turbines to generate maximum thrust.

SUMMARY OF THE INVENTION

This invention is directed to an aircraft having a rotating gas turbine engine. More specifically, the aircraft comprises a main frame having a top domed section and a rotatable bottom domed section. The aircraft further comprises a plurality of wings that are distributed about the main frame in an approximately equiangular arrangement. The engine of the aircraft has an inlet positioned within a top domed section to admit air into the engine and at least one outlet positioned within the bottom domed section to eject products of combustion produced by the engine. The gas turbine engine is at least partially attached with the bottom domed section and is adapted for rotation when the bottom domed section rotates. The products of combustion ejected from the outlet(s) of the engine provide a propulsive thrust to the aircraft and thus rotation of the bottom domed section controls directional movement of the aircraft. The aircraft can further comprise retractable landing gear.

In another embodiment, the aircraft further comprises at least one pivotal flap member attached with each wing. The pivotal flap members are in communication with the rotating bottom domed section to further control the directional movement of the aircraft.

In yet another embodiment, the top domed section of the aircraft is adapted for rotation. The top domed section can also have a radar device adapted for rotation independent of the top domed section. The top domed section can have a missile bay and missiles for launching at targets in military operations.

In an embodiment of the aircraft having a multidirectional gas turbine engine as described herein, the gas turbine engine is generally comprised of a compressor, a combustion chamber, and at least two turbines. The compressor communicates with the combustion chamber, partitioned by a rotator, which separates the "cold" section of the compressor from the "hot" section of the combustion chamber. In turn, the combustion chamber communicates with two turbines mounted on opposite sides of the combustion chamber. The two turbines are coaxially mounted on two turbine shafts that are connected to a gear shaft regulator centrally located in the combustion chamber. The gear shaft regulator controls the rotation of the turbine shafts, which are capable of independent clockwise and counterclockwise rotation.

According to a preferred embodiment of the aircraft's engine, the compressor is vertically mounted above the combustion chamber. The vertical compressor has an inlet located at an upper end of the compressor and an outlet located at a lower end of the compressor, such that air received by the inlet moves downwardly through the compressor to the outlet. The outlet of the compressor is connected to a rotator, which in turn is connected to the combustion chamber. The rotator separates the compressor from the combustion chamber. The rotator is mounted to a vertical rotator shaft that runs centrically through the compressor. When the rotator shaft is rotated, it moves the rotator, which allows the combustion chamber and turbines to be rotated to adjust the direction of thrust from the turbines.

More particularly, the combustion chamber is located between a first turbine and a second turbine. The first turbine is opposite to the second turbine. The two turbines are coaxially mounted on two turbine shafts, with the first turbine and second turbine being mounted for independent rotation on the turbine shafts.

The first turbine is comprised of an assembly of radial turbine blades housed in a first turbine body. The first turbine body extends in a first direction from the combustion chamber and has a nozzle at its distal end.

The second turbine housing is comprised of an assembly of radial turbine blades housed in a second turbine body. The second turbine body extends in a second direction from the combustion chamber that is opposite to the first direction of the first turbine body. The second turbine body is divided into two ducts. A first duct bends to one side of the second turbine body and extends substantially parallel to the axis of the turbine shaft in the first direction. The first duct has a first duct nozzle. A second duct bends to the other side of the second turbine body and extends substantially parallel to the axis of the turbine shaft in the first direction. The second duct has a second duct nozzle.

Ambient air is received in the compressor where it is compressed to high pressure. The compressed air is mixed with fuel and ignited in the combustion chamber to produce high pressure, high velocity gas. The resulting pressurized gas mixture is directed simultaneously to the first turbine and the second turbine on opposite sides of the combustion chamber. The turbines turn on their respective turbine shafts. The first turbine rotates a first turbine shaft in a first direction (e.g. clockwise) and the second turbine rotates a second turbine shaft in a second direction (e.g. counterclockwise).

The high pressure, high velocity gas from the turbines is expelled through the nozzles. The gas that is directed through the first turbine flows in a first direction and is expelled through a first nozzle in the first direction (downstream). Because the second turbine is oppositely mounted to the first turbine, the gas that is directed through the second turbine flows in a second direction that is opposite to the first direction. The gas is then redirected by the ducts and expelled through the first duct nozzle and second duct nozzle in the first direction.

DETAILED DESCRIPTION OF THE INVENTION

The present invention describes an aircraft having a rotatable engine. In particular, the engine is at least partially lodged within a rotating bottom domed section of the aircraft and is positioned so that the engine's exhaust exits the aircraft from the rotating bottom domed section. The direction of the aircraft can thereby be controlled by the direction that the engine's exhaust is expelled as a result of rotation of the bottom domed section. The bottom domed section can rotate a full 360° to enable directional control and flight of the aircraft in any angle along the 360° rotation. The aircraft also comprises wings and pivotal flap members on the wings to further stabilize and control the flight and direction of the aircraft.

FIGS. 1A-3B illustrate embodiments of the aircraft (200) according to the invention. As shown in FIGS. 1A-1E, the aircraft (200) comprises a main frame (210), which is the main body section of the aircraft (200). According to the present invention, the aircraft (200) can either be manned by a pilot or unmanned for situations in which manned operations are too dangerous, such as in military operations. Accordingly, the main frame (210) of the aircraft (200) can be of any appropriate size and configuration depending on the embodiment of the aircraft (200). For example, the main frame (210) can have a smaller size for unmanned aircraft that is remotely operated, or a larger size to accommodate a pilot control section and passenger section. The main frame (210) can also include windows (not shown) for manned operation in the pilot section and in the passenger section. For either mode of operation, the main frame (210) houses the controls of the aircraft (200) for its manned operation or receivers for its remote operation.

A top domed section (220) and a bottom domed section (230) are rotatably attached to the main frame (210) of the aircraft (200). Both the top domed section (220) and bottom domed section (230) are independently capable of rotating 360° in either a clockwise or counterclockwise direction. Embodiments of the top domed section (220) are shown in FIGS. 1A-1E and 2A-2C. The top domed section (220) can include a missile bay (222) for housing and launching missiles (224) at desired targets for military uses of the aircraft (200). The top domed section (220) can also include a radar device (226). The missiles (224) and radar device (226) can be controlled by pilot-manned mechanical controls within the main frame (210) of the aircraft (200) or by manipulation of a remote device capable of remotely controlling the aircraft (200).

As illustrated in FIGS. 1A-1D, 2A and 2C, the radar device (226) is positioned on the top domed section (220) and is capable of rotation, independent of the top domed section's (220) rotation. The radar device (226) uses electromagnetic waves to identify the range, altitude, direction, position or speed of moving and fixed objects. The aircraft (200) can use the radar device (226) to warn of obstacles in the path of the aircraft (200), give accurate altitude assessments, and assist control of the aircraft (200) during flight and landing. The radar device (226) can also be used for military purposes, e.g., to launch missiles (224) from the missile bay (222) of the aircraft (200) at air, land, and sea targets.

Figure 3A:
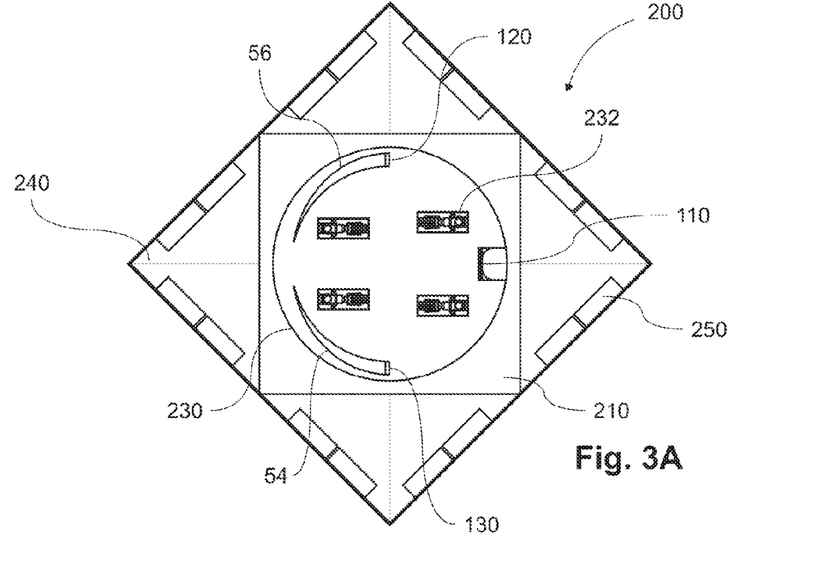
FIG. 3A is a bottom orthogonal view of an embodiment of an aircraft according to the invention.
Figure 3B:
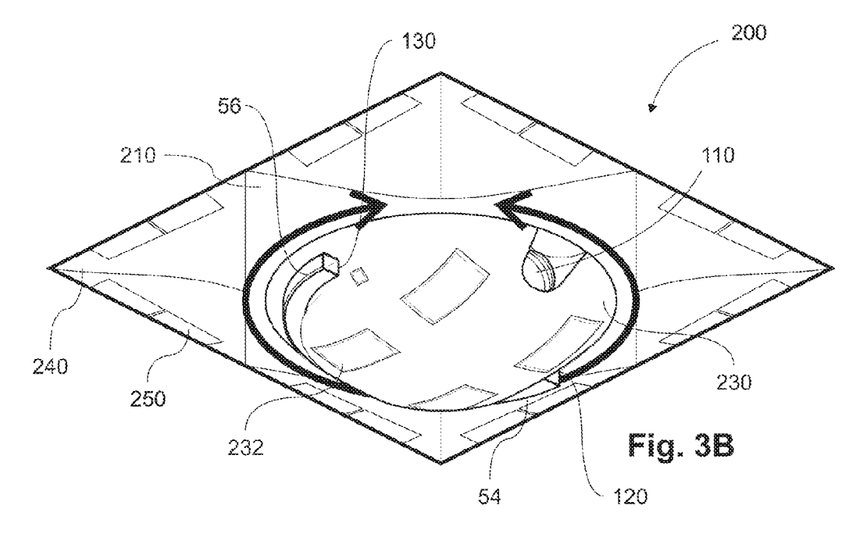
FIG. 3B is a bottom elevational view of an embodiment of an aircraft according to the invention.

Embodiments of the bottom domed section (230) are shown in FIGS. 1A-1E and 3A-3B. The bottom domed section (230) includes retractable landing gear (232). The retractable landing gear (232), as illustrated in FIGS. 1A-E and 3A-B, supports the aircraft (200) on the ground and allows the aircraft (200) to taxi, takeoff and land. The retractable landing gear (232) comprises a conventional wheel assembly which can include shock absorbers. The wheel assembly of the retractable landing gear (232) can retract into the main frame (210) of the aircraft (200) with the wheels concealed behind doors to decrease drag in flight. The retractable landing gear (232) can be assembled and positioned on the aircraft (200) in different arrangements, and can include as many wheel assemblies as necessary to support the aircraft (200), especially for larger embodiments of the aircraft (200) that include a passenger section and pilot control section within the main frame (210). As shown in FIGS. 3A and 3B, the retractable landing gear (232) of the aircraft (200) can include four wheel assemblies.

Figure 1A:
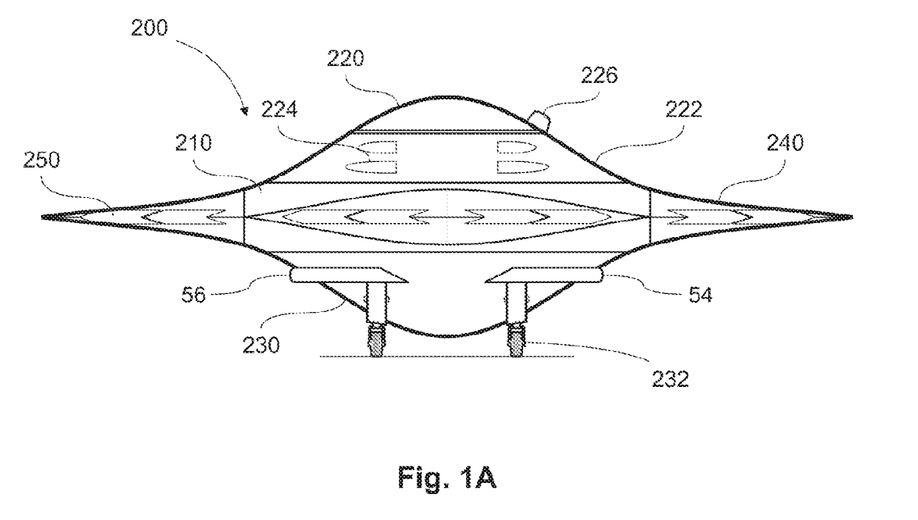
FIG. 1A is a front orthogonal view of an embodiment of an aircraft according to the invention.
Figure 1B:
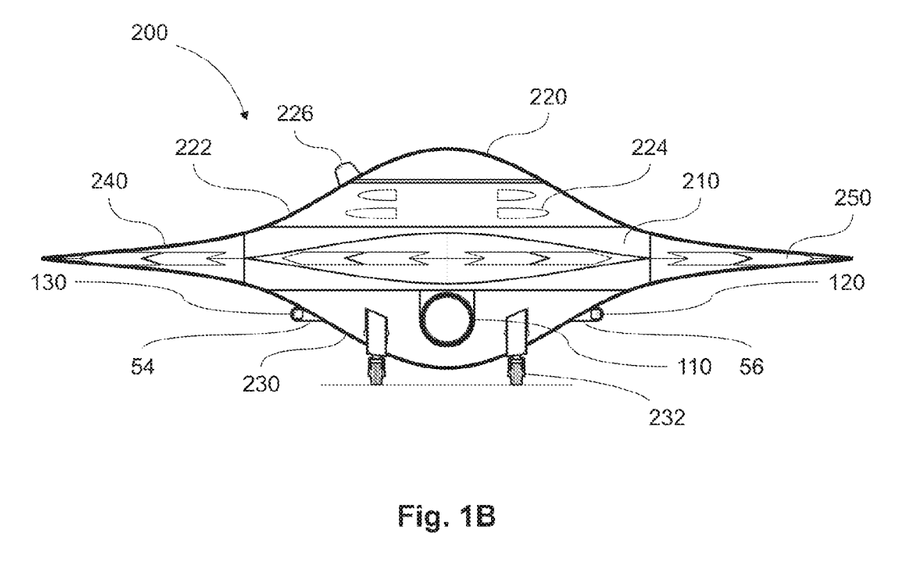
FIG. 1B is a rear orthogonal view of an embodiment of an aircraft according to the invention.
Figure 1C:
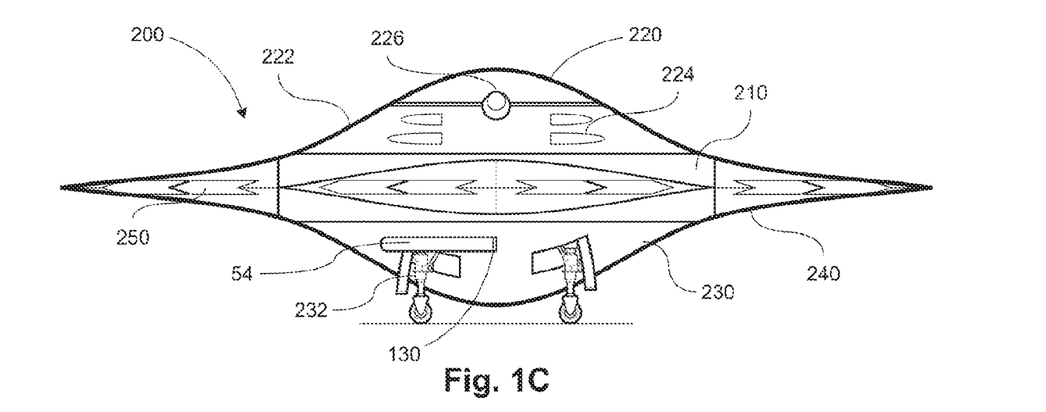
FIG. 1C is a side orthogonal view of an embodiment of an aircraft according to the invention.
Figure 1D:
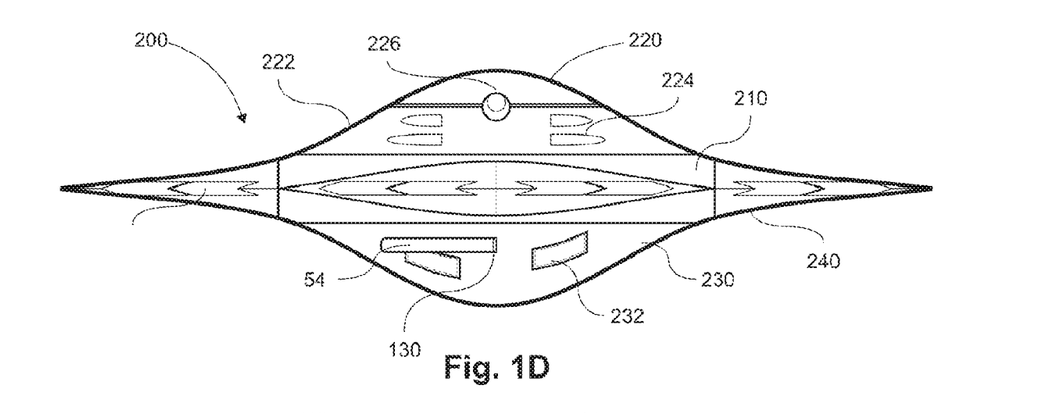
FIG. 1D is a side orthogonal view of an embodiment of an aircraft according to the invention.
Figure 1E:
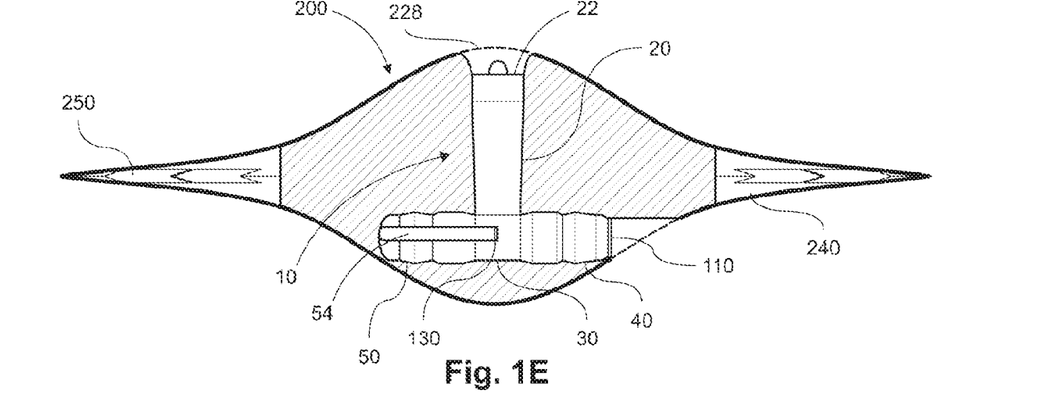
FIG. 1E is a side cross-sectional view of an embodiment of an aircraft and engine according to the invention.

As shown in a cross-sectional view of the aircraft in FIG. 1E, the engine (10) of the aircraft (200) is partially housed within the top domed section (220), the main frame (210), and at least partially attached with the bottom domed section (230) of the aircraft (200). The engine (10) generates pressurized gas by the combustion of fuel. The pressurized gas is discharged by the outlet(s) (110, 120, 130) of the engine (10) to provide the principal thrust for the aircraft (200) for take off and when in flight.

In particular, the cold section of the engine, i.e. the air inlet (22) and compressor (20), is housed within the top domed section (220) and main frame (210) of the aircraft (200). The hot section of the engine (10), i.e. the combustion chamber (30) and turbine(s) (40, 50), is housed within the bottom domed section (230) of the aircraft. A conventional fuel tank means is included in the aircraft (200) to supply and store fuel for the engine (10).

Figure 2A:
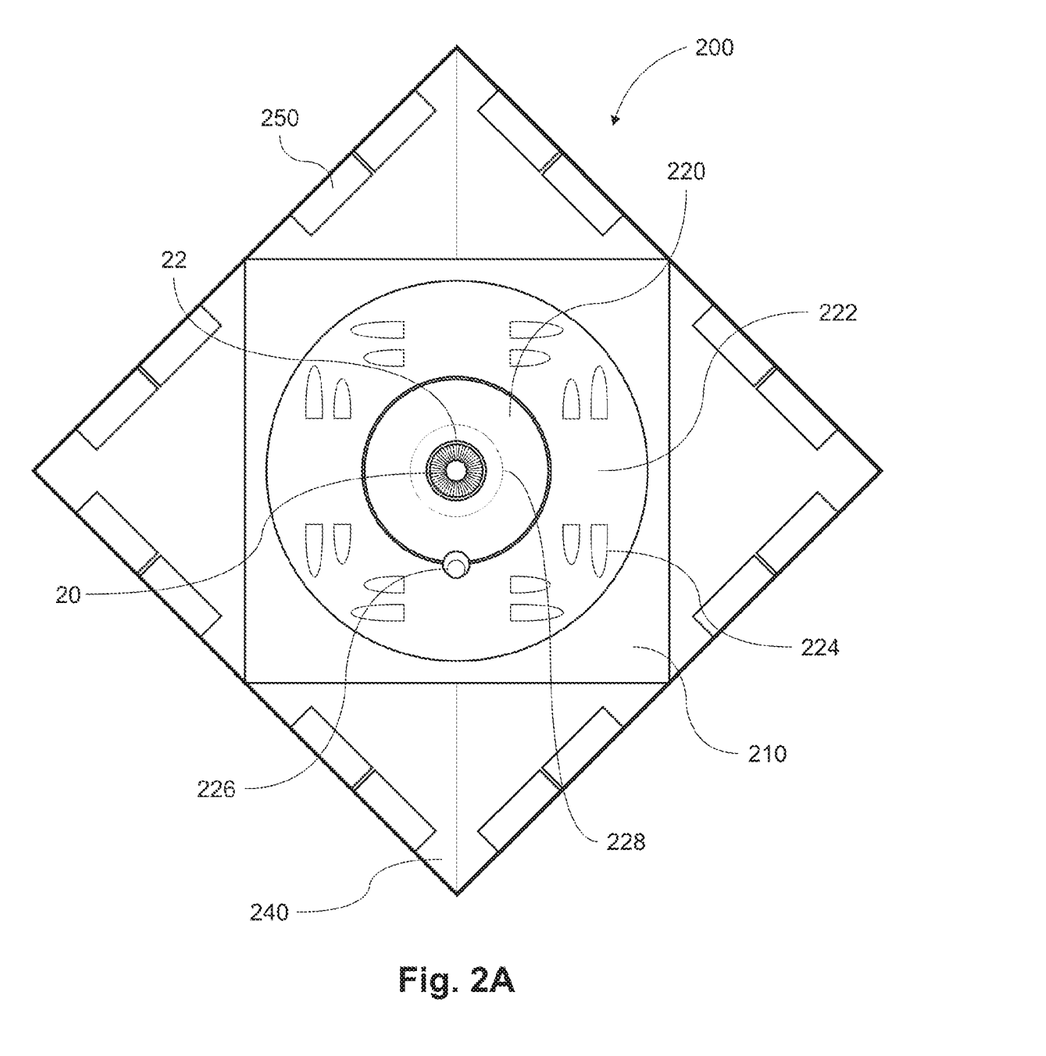
FIG. 2A is a top orthogonal view of an embodiment of an aircraft according to the invention.
Figure 2B:
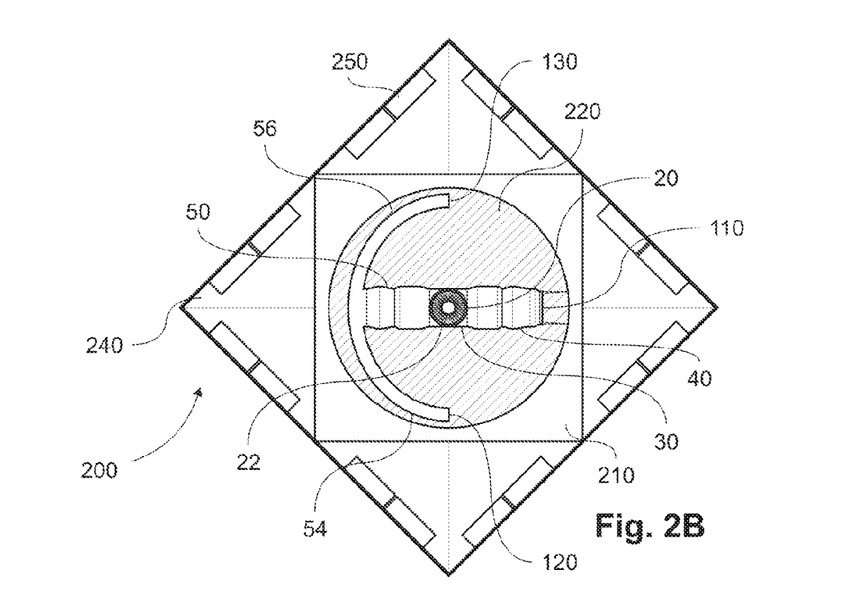
FIG. 2B is a top cross-sectional view of an embodiment of an aircraft and engine according to the invention.
Figure 2C:
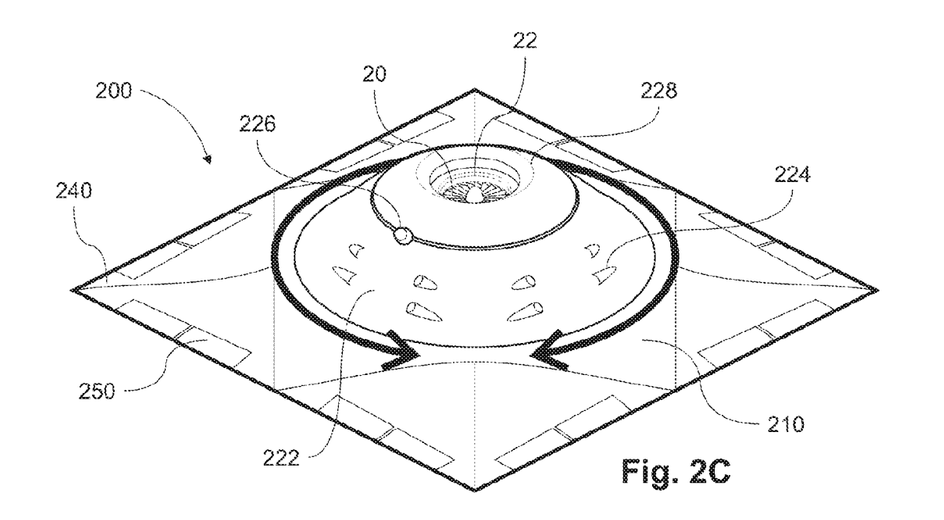
FIG. 2C is a top elevational view of an embodiment of an aircraft according to the invention.

As shown in FIGS. 1E and 2C, the engine's air inlet (22) is positioned in the top domed section (220) to admit airflow into the engine (10). The inlet allows smooth and continuous air intake into the air compressor (20) of the engine (10). The top domed section (220) has an aperture (228) therethrough to accommodate the air inlet (22), and can be adapted to further allow smooth and continuous air intake into the engine (10). Once air enters the engine (10), the compressor (20) compresses the air to high pressure and communicates the air to the combustion chamber (30), where it is mixed with gas and ignited to undergo combustion. The resulting combustion produces a high pressure, high velocity gas mixture that is directed to one or more turbines (40, 50), motivating the turbine(s) to generate force. The gas mixture is expelled from the turbine(s) (40, 50) through the outlet(s) (110, 120, 130) of the engine (10), generating thrust by accelerating the hot exhaust gas mixture to atmospheric pressure. The bottom domed section (230) is adapted to accommodate the engine's outlet(s) (110, 120, 130). For example, as shown in FIG. 3B, the bottom domed section (230) is adapted to accommodate three engine outlets (110, 120, 130). The thrust output energy of the engine (10), i.e. the products of combustion or force generated by ignited, pressurized gas, is used to propel the aircraft (200) in a direction opposite to the direction of the engine's (10) output.

For directional control of the aircraft (200) described herein, the bottom domed section (230) is rotated so that the engine's (10) thrust is correspondingly rotated in the desired direction. Because the engine (10) is at least partially attached with the bottom domed section (230), the engine (10) and the thrust emitted from its output(s) (110, 120, 130) rotate according to the rotation of the bottom domed section (230). Thus, the aircraft (200) will move forward in a direction opposite from the engine's (10) thrust output, along any angle of 360° rotating bottom domed section (230). The rotation of the bottom domed section (230), and resulting direction of the aircraft (200), can be controlled by pilot-manned mechanical controls within the main frame (210) of the aircraft (200). The rotation of the bottom domed section (230) can also be controlled by manipulation of a remote device capable of remotely controlling the aircraft (200).

In addition, the direction of the aircraft (200) is further controlled and stabilized by the wings (240) and pivotal flap members (250) attached with the wings (240). As illustrated in FIGS. 1A-3C, a plurality of wings (240) are attached with the main frame (210) of the aircraft (200). As the aircraft (200) is propelled forward by the thrust of the engine (10), the aircraft (200) is capable of flight using the forward motion that generates lift as the wings (240) move through the air. The wings (240) are arranged in an equiangular manner about the main frame (210). As shown in FIGS. 1A-1E, 2A-2C and 3A-3B, four wings (240) are attached to the main frame in an equiangular arrangement. The equiangular arrangement allows the aircraft (200) to fly in any direction based on the rotating thrust of the engine (10), which rotates in any 360° direction according to the rotation of the bottom domed section (230).

Illustrations of the pivotal flap members (250) are shown in FIGS. 1A-1D, 2A-2C, and 3A-3B. The pivotal flap members (250) can be attached with the wings (240) via any conventional attachment that allows pivotal movement of the flaps (250), such as a hinged attachment. As shown in the non-limiting FIGS. 1A-1D, the pivotal flap members' (250) attachment can be embedded within the wings (240). The pivotal flap members (250) are control sections that can move up or down or hold in any angle between the tops and bottoms of the wings (240) to further stabilize and control the direction of the aircraft's (200) flight. For example, the pivotal flap members (250) can move to assist in the take-off and landing of the aircraft (200). The pivotal flap members (250) can function via pilot manned controls or via remote operation.

Each pivotal flap member (250) on the wings (240) of the aircraft (200) can function independently from or in conjunction with the rotating bottom domed section (230) to further control the directional movement of the aircraft (200). In the latter embodiment, the pivotal flap members (250) can be interconnected with the rotating bottom domed section (230) mechanically or electronically. Depending on the direction of the thrust of the engine (10) resulting from the bottom domed section's (230) rotation, the pivotal flap members (250) will adjust accordingly to stabilize and accommodate the directional changes of the aircraft (200). Because the pivotal flap members (250) and wings (240) are distributed about the entire aircraft (200), the pivotal flap members (250) can fluctuate to control the roll, yaw and pitch of the aircraft (200) and stabilize the aircraft (200) while in flight.

Figure 4:
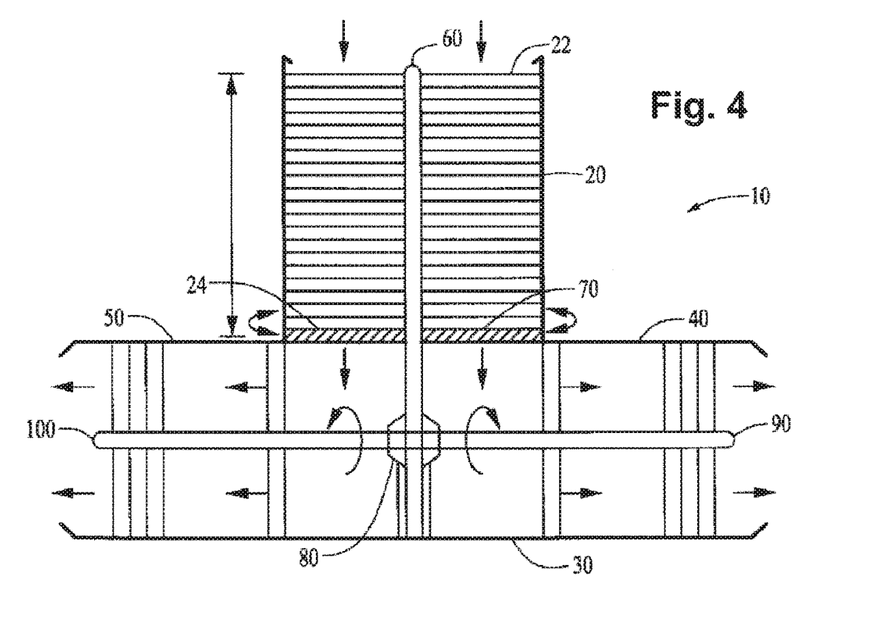
FIG. 4 is a side view of an embodiment of a gas turbine engine utilized by an aircraft according to the invention.
Figure 5:
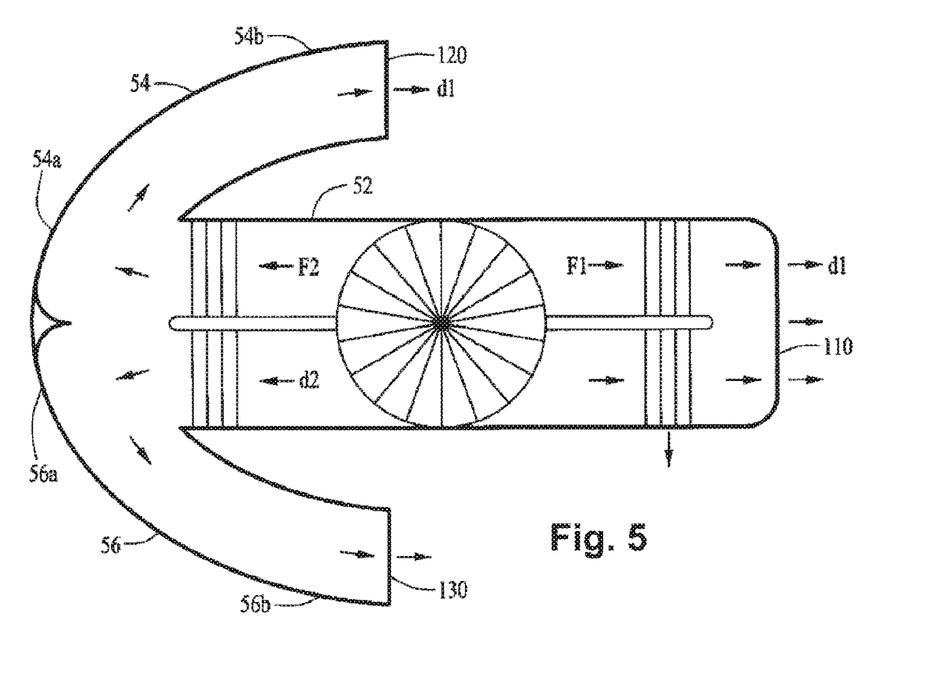
FIG. 5 is a top view of an embodiment of a gas turbine engine utilized by an aircraft according to the invention.
Figure 6:
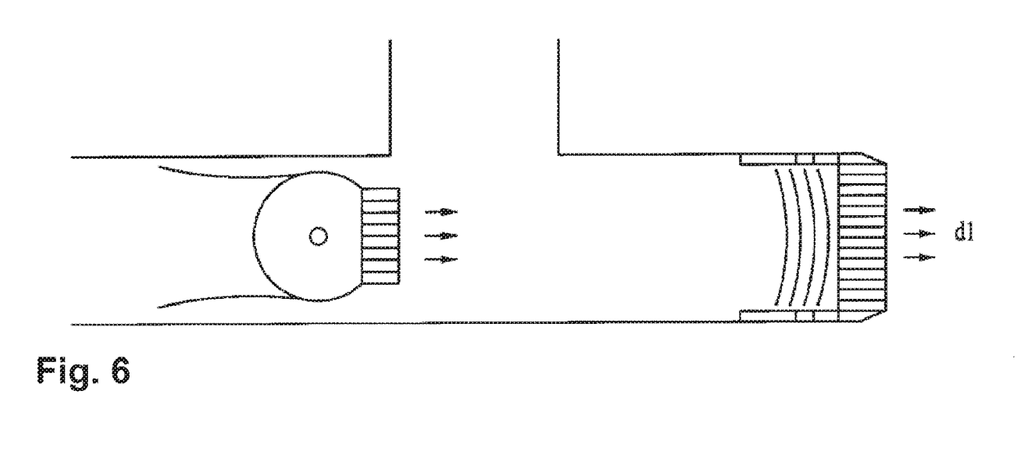
FIG. 6 is a side view of an embodiment of a gas turbine engine utilized by an aircraft according to the invention.

As shown in FIGS. 1E, 2B, and 3A-B, the aircraft (200) can utilize an efficient multidirectional gas turbine engine (10). The gas turbine engine (10) is described in further detail herein and is shown in FIGS. 4-6. The multidirectional gas turbine engine (10) described herein allows for more efficient generation of thrust from a single engine by producing thrust that is not dissipated from two turbines and through three outlets. Though the embodiments of the aircraft (200) illustrated in FIGS. 1E, 2B, and 3A-3B show use of the multidirectional gas turbine engine (10) described herein, a conventional gas turbine engine can also be utilized in the aircraft.

FIGS. 4-6 illustrate the multidirectional turbine engine (10) of the aircraft in detail. Regarding the gas turbine engine (10) that can be utilized by the aircraft, as shown in FIG. 4, the engine (10) comprises a compressor (20), a combustion chamber (30), and at least two turbines (40, 50). A rotator shaft (60) extends centrically through compressor (20). A rotator (70), mounted to rotator shaft (60), separates compressor (20) from combustion chamber (30). A gear shaft regulator (80), located in combustion chamber (30), is mounted to rotator shaft (60). A first turbine shaft (90) mounts to one side of gear shaft regulator (80) and a second turbine shaft (100) mounts to the other side of gear shaft regulator (80), with first turbine shaft (90) and second turbine shaft (100) being coaxial to one another and perpendicular to rotator shaft (60). First turbine shaft (90) and second turbine shaft (100) are capable of independent rotation. A first turbine (40) is mounted on the first turbine shaft (90) and a second turbine (50) is mounted on the second turbine shaft (100).

The compressor (20) has an inlet (22) and an outlet (24). In a preferred embodiment of the gas turbine engine (10) as shown in FIG. 4, the compressor (20) is centrally mounted above the combustion chamber (30), though one of ordinary skill in the art would recognize that the compressor (20) can be oriented in any number of ways with respect to the combustion chamber (30). As shown in FIG. 4, the outlet (24) of compressor (20) connects with rotator (70) and communicates with combustion chamber (30).

Air is received in inlet (22) and travels downward through compressor (20) towards outlet (24). As air travels through compressor (20), it is compressed to high pressure. The compressed air enters the combustion chamber (30), where it is mixed with fuel and ignited by an ignition means (not shown) in the combustion chamber (30) to produce high pressure, high velocity gas. The resulting pressurized gas mixture is directed to a first turbine (40) and a second turbine (50) on opposite sides of combustion chamber (30).

The first turbine (40) is connected to a first side of combustion chamber (30). A second turbine (50) is connected to a second side of combustion chamber (30) that is opposite to the first side of combustion chamber (30) as shown in FIG. 4. Ignited gas from combustion chamber (30) is directed separately to first turbine (40) and second turbine (50). When the ignited gas from combustion chamber (30) is directed to first turbine (40), it motivates first turbine (40) to generate a force (F1) in a first direction (d1). When the ignited gas from combustion chamber (30) is directed to second turbine (50), it motivates second turbine (50) to generate a force (F2) in a second direction (d2) that is opposite to first direction (d1).

In a preferred embodiment of the gas turbine engine (10) as shown in FIG. 5, the second turbine (50) is further comprised of a turbine housing (52) with at least two ducts (54, 56). Combustion chamber (30) connects to turbine housing (52). Turbine housing (52) connects to first duct (54). The first duct (54) has a first section (54a) extending from turbine housing (52) in second direction (d2) and a second section (54b) continuing from first section (54a) that is turned reversely to extend in first direction (d1). Turbine housing (52) also connects to second duct (56). In a mirror configuration of first duct (54), second duct (56) has a first section (56a) extending from turbine housing (52) in second direction (d2) and a second section (56b) continuing from first section (56a) that is turned reversely to extend in first direction (d1).

Ignited gas from combustion chamber (30) is directed to second turbine (50), where it enters turbine housing (52), travels through the two ducts (54, 56), and exits in first direction (d1) along with the gas from first turbine (40).

Figure 7:
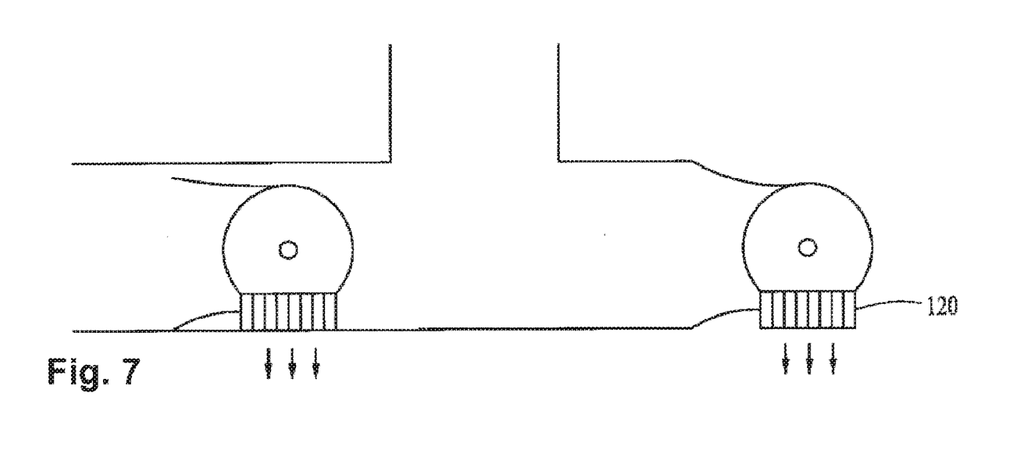
FIG. 7 is a side view of an embodiment of a gas turbine engine utilized by an aircraft according to the invention.

First turbine (40) and second turbine (50) have movable nozzles/outlets for expelling the ignited gas in variable directions. First turbine (40) has a nozzle/outlet (110) as shown in FIG. 5. Second turbine (50) has a nozzle/outlet (120) on the first duct (54) and a nozzle/outlet (130) on the second duct (56). The nozzles (outlets) (110, 120, and 130) are adjustable to direct thrust from the ignited gas in variable directions as shown in FIGS. 6 and 7.

An aircraft (200) having the aforementioned multidirectional gas turbine engine (10) maximizes the thrust output because energy is not dissipated as the high velocity, high pressure gas mixture from the combustion chamber travels to the first and second turbine and out of three outputs simultaneously.

This invention is not to be limited by the embodiments shown in the drawings and described in the description, which is given by way of example and not of limitation, but only in accordance with the scope of the appended claims.

I claim:

1. An aircraft comprising:
   a main frame having a top domed section and a bottom domed section, wherein said bottom domed section is adapted for rotation;
   a plurality of wings, wherein said wings are distributed about said main frame in an approximately equiangular arrangement;
   a gas turbine engine having an inlet positioned within said top domed section to admit air into said engine and at least one outlet positioned within said bottom domed section to eject products of combustion of said engine, wherein said gas turbine engine is at least partially attached with said bottom domed section and is adapted for rotation when said bottom domed section rotates, whereby said products of combustion ejected from said outlet of said engine provide a propulsive thrust to said aircraft and rotation of said bottom domed section controls directional movement of the aircraft.

2. The aircraft of claim 1, further comprising at least one pivotal flap member attached with each said wing, wherein each said pivotal flap member is in communication with said rotating bottom domed section to further control the directional movement of said aircraft.

3. The aircraft of claim 1, wherein said top domed section is adapted for rotation.

4. The aircraft of claim 1, wherein said top domed section comprises a radar device adapted for rotation.

5. The aircraft of claim 3, wherein said top domed section comprises a missile bay and at least one missile.

6. The aircraft of claim 1, wherein said bottom domed section further comprises retractable landing gear.

7. The aircraft of claim 1, wherein said gas turbine engine further comprises:
   a compressor, said compressor capable of pressurizing air;
   a combustion chamber in communication with said compressor, said combustion chamber having a means for igniting pressurized air from said compressor to create ignited gas;
   a first turbine connected to a first side of said combustion chamber, wherein said ignited gas from said combustion chamber motivates said first turbine to generate force in a first direction; and
   a second turbine connected to a second side of said combustion chamber that is diametrical to said first side of said combustion chamber, wherein said ignited gas from said combustion chamber motivates said second turbine to generate force in a second direction that is opposite to said first direction.

8. The aircraft of claim 7, wherein said gas turbine engine further comprises:
   a rotator shaft, said rotator shaft extending centrically through said compressor;
   a rotator, said rotator mounted to said rotator shaft and connected to said combustion chamber;
   whereby said rotator separates said combustion chamber from said compressor, and said combustion chamber is capable of rotation by movement of said rotator.

9. The aircraft of claim 8, wherein said compressor has an inlet and an outlet, said outlet connecting with said rotator and communicating with said combustion chamber.

10. The aircraft of claim 9, wherein said compressor is located above said combustion chamber such that air received in said inlet flows downwardly to said outlet.

11. The aircraft of claim 7, wherein said first turbine has a movable nozzle for expelling said ignited gas in variable directions.

12. The aircraft of claim 7, said second turbine further comprising:
   a turbine housing, said turbine housing connected to said combustion chamber;
   a first duct connected to said turbine housing, said first duct having
      a first section extending from said turbine housing in said second direction and
      a second section continuing from said first section that is bent reversely to extend in said first direction;
   a second duct connected to said turbine housing, said second duct having
      a first section extending from said turbine housing in said second direction and
      a second section continuing from said first section that is bent reversely to extend in said first direction;
   wherein said ignited gas flowing through said second turbine is separated by said first duct and said second duct.

13. The aircraft of claim 12, wherein said second turbine has a movable left nozzle and a movable right nozzle;
   said movable left nozzle fixed to said first duct for expelling said ignited gas in variable directions; and,
   said movable right nozzle fixed to sad second duct for expelling said ignited gas in variable directions.

14. The aircraft of claim 8, said gas turbine engine further comprising:
   a gear shaft regulator, said gear shaft regulator mounted to said rotator shaft;
   a first turbine shaft, said first turbine shaft mounted to said gear shaft regulator in said combustion chamber;
   a second turbine shaft, said second turbine shaft mounted to said gear shaft regulator in said combustion chamber;

wherein said first turbine is mounted on said first turbine shaft, and said second turbine is mounted on said second turbine shaft, said first turbine shaft and said second turbine shaft being capable of independent rotation.

15. The aircraft of claim 7, wherein said gas turbine engine further comprises:
a compressor, said compressor capable of pressurizing air;
a combustion chamber in communication with said compressor, said combustion chamber having a means for igniting pressurized air from said compressor to create ignited gas;
at least two turbines connected to opposite sides of said combustion chamber, wherein said ignited gas from said combustion chamber motivates said turbines to generate force in multiple directions.

* * * * *